United States Patent
Kwak et al.

(10) Patent No.: US 11,558,164 B2
(45) Date of Patent: *Jan. 17, 2023

(54) METHOD AND APPARATUS FOR TRANSMITTING AND RECEIVING CONTROL CHANNELS BY RESTRICTING A SET OF THE CONTROL CHANNELS IN A WIRELESS COMMUNICATION SYSTEM

(71) Applicant: Samsung Electronics Co., Ltd., Gyeonggi-do (KR)

(72) Inventors: Yong-Jun Kwak, Gyeonggi-do (KR); Hwan-Joon Kwon, Gyeonggi-do (KR); Joon-Young Cho, Gyeonggi-do (KR); Ju-Ho Lee, Gyeonggi-do (KR); Jin-Kyu Han, Seoul (KR); Youn-Hyoung Heo, Gyeonggi-do (KR); Ping Wang, Beijing (CN)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/087,137

(22) Filed: Nov. 2, 2020

(65) Prior Publication Data

US 2021/0051637 A1  Feb. 18, 2021

Related U.S. Application Data

(63) Continuation of application No. 16/676,209, filed on Nov. 6, 2019, now Pat. No. 10,827,481, which is a (Continued)

(30) Foreign Application Priority Data

May 2, 2007 (KR) .................. 10-2007-0042817
Aug. 7, 2007 (KR) .................. 10-2007-0079269

(51) Int. Cl.
*H04W 72/04* (2009.01)
*H04W 52/02* (2009.01)
(Continued)

(52) U.S. Cl.
CPC ....... *H04L 5/0053* (2013.01); *H04W 52/0216* (2013.01); *H04W 72/042* (2013.01);
(Continued)

(58) Field of Classification Search
CPC ... H04W 72/042; H04W 72/14; H04W 72/04; H04W 72/02; H04W 72/1294;
(Continued)

(56) References Cited

U.S. PATENT DOCUMENTS 4,794,643 A 12/1988 Saeki et al.
5,873,043 A 2/1999 Comer
(Continued)

FOREIGN PATENT DOCUMENTS

CN 1245624 2/2000
CN 1933390 3/2007
(Continued)

OTHER PUBLICATIONS

Ericsson, "Summary of E-mail Discussion on Control Signaling", R1-1071611, TSG-RAN WG1 #48bis, Mar. 26-30, 2007, 3 pages.
(Continued)

*Primary Examiner* — Candal Elpenord
(74) *Attorney, Agent, or Firm* — The Farrell Law Firm, P.C.

(57) ABSTRACT

A method and apparatus are provided for transmitting and receiving control information. A method in a base station includes transmitting, to a terminal, information associated with a resource region carrying a control channel; transmitting, to the terminal, a plurality of values associated with control channel candidates, each of the plurality of values
(Continued)

corresponding to each of a plurality of numbers associated with CCEs constituting one control channel candidate, wherein the each of the plurality of values indicates a number of control channel candidates to be monitored by the terminal; determining a set of control channel candidates based on an ID of the terminal and at least one of the plurality of values associated with the control channel candidates; selecting at least one control channel candidate from among the set of control channel candidates; and transmitting the control information to the terminal through the at least one selected control channel candidate in the resource region.

18 Claims, 10 Drawing Sheets

Related U.S. Application Data continuation of application No. 16/148,711, filed on Oct. 1, 2018, now Pat. No. 10,575,298, which is a continuation of application No. 15/614,174, filed on Jun. 5, 2017, now Pat. No. 10,091,780, which is a continuation of application No. 14/570,437, filed on Dec. 15, 2014, now Pat. No. 9,674,826, which is a continuation of application No. 13/681,018, filed on Nov. 19, 2012, now Pat. No. 8,934,434, which is a continuation of application No. 13/481,044, filed on May 25, 2012, now Pat. No. 8,315,195, which is a continuation of application No. 12/112,376, filed on Apr. 30, 2008, now Pat. No. 8,189,502.

(51) Int. Cl.
  *H04L 5/00* (2006.01)
  *H04W 74/00* (2009.01)
  *H04W 72/14* (2009.01)
  *H04L 27/26* (2006.01)
  *H04W 8/26* (2009.01)

(52) U.S. Cl.
  CPC ......... *H04W 72/14* (2013.01); *H04W 74/006* (2013.01); *H04L 27/2626* (2013.01); *H04W 8/26* (2013.01); *H04W 52/0245* (2013.01); *H04W 72/04* (2013.01); *Y02D 30/70* (2020.08)

(58) Field of Classification Search
  CPC ......... H04W 72/0446; H04W 52/0216; H04W 52/02; H04W 52/0245; H04W 74/006; H04L 5/0053; H04L 5/00; H04L 5/0051; H04L 27/2626; H04L 5/005; Y02D 70/1262; Y02D 70/1242; Y02D 70/00; Y02D 70/20
  USPC .................................................. 370/329–330
  See application file for complete search history.

(56) References Cited

U.S. PATENT DOCUMENTS

| | | | |
|---|---|---|---|
| 6,418,313 | B1 | 7/2002 | Wallstedt |
| 6,594,473 | B1 | 7/2003 | Dabak et al. |
| 7,283,498 | B2 | 10/2007 | Ro et al. |
| 7,283,508 | B2 | 10/2007 | Choi et al. |
| 7,756,087 | B2 | 7/2010 | Kim et al. |
| 7,912,135 | B2 | 3/2011 | Kwak et al. |
| 7,912,471 | B2 | 3/2011 | Kodikara Patabandi et al. |
| 8,189,502 | B2 | 5/2012 | Kwak et al. |
| 8,934,434 | B2 | 1/2015 | Kwak et al. |
| 2001/0043583 | A1 | 11/2001 | Sakoda et al. |
| 2002/0075838 | A1 | 6/2002 | Choi et al. |
| 2002/0159410 | A1 | 10/2002 | Odenwalder et al. |
| 2004/0043784 | A1 | 3/2004 | Czaja et al. |
| 2004/0120249 | A1 | 6/2004 | Blasco Claret et al. |
| 2004/0190640 | A1 | 9/2004 | Dubuc et al. |
| 2005/0201325 | A1 | 9/2005 | Kang et al. |
| 2005/0250497 | A1 | 11/2005 | Ghosh et al. |
| 2005/0288027 | A1 | 12/2005 | Cho et al. |
| 2006/0083157 | A1 | 4/2006 | Cheng et al. |
| 2006/0285481 | A1 | 12/2006 | Lane et al. |
| 2007/0047483 | A1 | 3/2007 | Khan |
| 2007/0058523 | A1 | 3/2007 | Cho et al. |
| 2007/0076687 | A1 | 4/2007 | Low et al. |
| 2007/0149137 | A1 | 6/2007 | Richardson et al. |
| 2007/0198623 | A1 | 8/2007 | Karino |
| 2007/0214370 | A1 | 9/2007 | Sato et al. |
| 2008/0008256 | A1 | 1/2008 | Matsumoto et al. |
| 2008/0090575 | A1 | 4/2008 | Barak et al. |
| 2008/0235409 | A1 | 9/2008 | Ryzhykh |
| 2008/0304588 | A1 | 12/2008 | Pi |
| 2009/0022110 | A1 | 1/2009 | Muharemovic et al. |
| 2009/0103562 | A1 | 4/2009 | Frederiksen et al. |
| 2009/0168922 | A1* | 7/2009 | Malladi ................ H04L 1/0038 375/316 |
| 2009/0219868 | A1 | 9/2009 | Lee et al. |
| 2010/0214990 | A1 | 8/2010 | Fukui |

FOREIGN PATENT DOCUMENTS

| | | |
|---|---|---|
| JP | 11-069421 | 3/1999 |
| JP | 2003-284135 | 10/2003 |
| JP | 2005-520432 | 7/2005 |
| JP | 2007-528662 | 10/2007 |
| JP | 2008-278341 | 11/2008 |
| JP | 2010-525725 | 7/2010 |
| KR | 1020050016525 | 2/2005 |
| KR | 1020060044329 | 5/2006 |
| KR | 1020060134853 | 12/2006 |
| WO | WO 02/065664 | 8/2002 |
| WO | WO 2004/039027 | 5/2004 |
| WO | WO 2005/112486 | 11/2005 |
| WO | WO 2006/013729 | 2/2006 |
| WO | WO 2006/116102 | 11/2006 |
| WO | WO 2008/114541 | 9/2008 |

OTHER PUBLICATIONS

Ericsson, PDCCH Blind Decoding—Outcome of Offline Discussions, R1-081101, Feb. 11, 2008, 7 pages.
Ericsson et al., "Downlink Control Signaling", R1-071216, Feb. 14, 2007, 9 pages.
Texas Instruments, "Shared Control Channel Structure for E-UTRA Downlink", R1-061433, 3GPP TSG RAN WG1#45, May 8-12, 2006, 5 pages.
3rd Generation Partnership Project; Technical Specification Group Radio Access Network; User Equipment (UE) Procedures in Idle Mode and Procedures for Cell Reselection in Connected Mode (Release 5), 3GPP TS 25.304 V5.9.0, Sep. 2005, 44 pages.
3rd Generation Partnership Project 2, "3GPP2", "Medium Access Control Layer for Ultra Mobile Broadband (UMB) Air Interface Specification", 3GPP2 C.S0084-002-0, Version 1.0, Apr. 23, 2007, 284 pages.
3rd Generation Partnership Project; Technical Specification Group Radio Access Network; Physical Channels and Mapping of Transport Channels onto Physical Channels (FDD) (Release 6), 3GPP TS 25.211 V6.7.0, Dec. 2005, 50 pages.
3rd Generation Partnership Project; Technical Specification Group Radio Access Network; User Equipment (UE) Procedures in Idle Mode and Procedures for Cell Reselection in Connected Mode (Release 6), 3GPP TS 25.304 V6.9.0, Mar. 2006, 38 pages.
3GPP, 3rd Generation Partnership Project; 3GPP TS 25.331 V6.12.0 Dec. 2006, 1249 pages.
Ericsson et al.: "Way Forward on Downlink Control Signaling", R1-071223, Feb. 14, 2007.

(56) References Cited

OTHER PUBLICATIONS

Motorola: "Search Space Definition for L1/L2 Control Channels", 3GPP TSG RAN1 #50, Aug. 20-24, 2007.
Motorola: "E-UTRA DL L1/L2 Control Channel Design", 3GPP TSG RAN1 #48, R1-070787, Feb. 12-16, 2007.
3rd Generation Partnership Project; Technical Specification Group Radio Access Network; Physical Layer Procedures (Release 8), 3GPP TS 36.213 V1.0.0, Mar. 2007.
Nokia: "Structure and Transport of the Downlink Control Channels", R1-071003, 3GPP TSG RAN WG1 #48 Meeting, Feb. 16, 2007.
LG Electronics, "PDCCH Design Principles", R1-071548, 3GPP TSG RAN WG1 #48bis, Mar. 26-30, 2007, 4 pages.
European Search Report dated Dec. 8, 2016 issued in counterpart application No. 15193799.2-1854, 8 pages.
Samsung, "Restriction on PDCCH Monitoring Set", R1-072220, 3GPP TSG RAN WG1 #49, May 7-11, 2007.
Ericsson et al., "DL Control Channel Structure", R1-071820, 3GPP TSG-RAN WG1#48b, Apr. 3, 2007.
Nokia et al., "Way Forward on PDCCH CRC Size", R1-080062, 3GPP TSG-RAN Working Group 1 #51 bis, Jan. 14-18, 2007.
Nokia, "Tree Structure for the DL Control Channel", R1-071683, 3GPP TSG-RAN WG1 Meeting #48bis, Mar. 26-30, 2007, 3 pages.
Korean Office Action dated Aug. 30, 2015 issued in counterpart application No. 10-2014-0045863, 9 pages.
Japanese Office Action dated Dec. 2, 2014 issued in counterpart application No. 2014-063214.
Chinese Office Action dated Aug. 29, 2016 issued in counterpart application No. 201310606772.5, 16 pages.
Motorola, "PDCCH Search Space Assignment Hashing Function", R1-081289, 3GPP TSG RAN1 # 52 bis, Mar. 31-Apr. 4, 2008, 4 pages.
European Search Report dated Feb. 12, 2018 issued in counterpart application No. 17201708.9-1214, 12 pages.

\* cited by examiner

METHOD AND APPARATUS FOR TRANSMITTING AND RECEIVING CONTROL CHANNELS BY RESTRICTING A SET OF THE CONTROL CHANNELS IN A WIRELESS COMMUNICATION SYSTEM

PRIORITY

This application is a Continuation of U.S. application Ser. No. 16/676,209, which was filed in the U.S. Patent and Trademark Office (USPTO) on Nov. 6, 2019, which is a Continuation of U.S. application Ser. No. 16/148,711, which was filed in the USPTO on Oct. 1, 2018, and issued as U.S. Pat. No. 10,575,298 on Feb. 25, 2020, which is a Continuation of U.S. application Ser. No. 15/614,174, which was filed in the USPTO on Jun. 5, 2017, and issued as U.S. Pat. No. 10,091,780 on Oct. 2, 2018, which is a Continuation of U.S. application Ser. No. 14/570,437, which was filed in the USPTO on Dec. 15, 2014, and issued as U.S. Pat. No. 9,674,826 on Jun. 6, 2017, which is a Continuation of U.S. application Ser. No. 13/681,018, which was filed in the USPTO on Nov. 19, 2012, and issued as U.S. Pat. No. 8,934,434 on Jan. 13, 2015, which is a Continuation of U.S. application Ser. No. 13/481,044, which was filed in the USPTO on May 25, 2012, and issued as U.S. Pat. No. 8,315,195 on Nov. 20, 2012, which is a Continuation of U.S. Ser. No. 12/112,376, which was filed in the USPTO on Apr. 30, 2008, and issued as U.S. Pat. No. 8,189,502 on May 29, 2012, and claims priority under 35 U.S.C. § 119(a) to Korean Patent Application Serial Nos. 10-2007-0042817 and 10-2007-0079269, which were filed in the Korean Intellectual Property Office on May 2, 2007 and on Aug. 7, 2007, respectively, the entire disclosure of each of which is incorporated herein by reference.

BACKGROUND OF THE INVENTION

1. Field of the Invention

The present invention relates generally to a wireless communication system, and in particular, to a method and apparatus for transmitting and receiving control channels in an Orthogonal Frequency Division Multiple Access (OFDMA) system.

2. Description of the Related Art

Recently, in wireless communication systems, intensive research is being conducted on Orthogonal Frequency Division Multiplexing (OFDM) and OFDMA as a useful scheme for high-speed data transmission in wireless channels.

OFDM, a scheme for transmitting data using multiple carriers, is a type of Multi-Carrier Modulation (MCM) that converts a serial input symbol stream into parallel symbol streams and modulates each of the parallel symbol streams with multiple orthogonal subcarriers or subcarrier channels before transmission.

FIG. 1 is a diagram illustrating a structure of a transmitter in a conventional OFDM system. Referring to FIG. 1, an OFDM transmitter includes an encoder 101, a modulator 102, a serial-to-parallel converter 103, an Inverse Fast Fourier Transform (IFFT) block 104, a parallel-to-serial converter 105, and a Cyclic Prefix (CP) inserter 106. The encoder 101, i.e., a channel encoding block, performs channel encoding on a specific input information bit stream. Generally, a convolutional encoder, a turbo encoder, or a Low Density Parity Check (LDPC) encoder is used as the encoder 101. The modulator 102 generates modulation symbols by performing modulation, such as Quadrature Phase Shift Keying (QPSK), 8-ary Phase Shift Keying (8PSK), 16-ary Quadrature Amplitude Modulation (16QAM), 64QAM, and 256QAM, on the output of the encoder 101. Although not illustrated in FIG. 1, a rate matching block for performing repetition and puncturing can be further included between the encoder 101 and the modulator 102. The serial-to-parallel converter 103 serves to convert the serial output of the modulator 102 into parallel data.

The IFFT block 104 performs an IFFT operation on the output of the serial-to-parallel converter 103. The output of the IFFT block 104 is converted into serial data by the parallel-to-serial converter 105. Thereafter, the CP inserter 106 inserts a CP code into the output of the parallel-to-serial converter 105.

The Long Term Evolution (LTE) system, which is now under discussion as the next generation wireless communication system of the Universal Mobile Telecommunication Service (UMTS) system in the $3^{rd}$ Generation Partnership Project (3GPP) standardization organization, uses Single Carrier Frequency Division Multiple Access (SC-FDMA) for the uplink to solve the high Peak-to-Average Power Ratio (PAPR) problem of OFDMA. SC-FDMA, a type of OFDM, can be realized by adding an FFT block to a front of the IFFT block 104 and pre-coding pre-IFFT data.

FIG. 2 conceptually illustrates resources of a conventional OFDM system. As illustrated in FIG. 2, in OFDM or SC-FDMA, wireless resources are expressed as a two-dimensional time-frequency array. More specifically, the horizontal axis represents a time domain 201 and the vertical axis represents a frequency domain 202. In the time domain 201, 7 OFDM symbols constitute one slot 204, and two slots constitute one subframe 205. Generally, one subframe 205 has the same length as a Transmission Time Interval (TTI), which is the basic transmission unit.

FIG. 3 illustrates a data transmission and reception procedure between a base station and a terminal in a conventional OFDM system. Referring to FIG. 3, in step 303, a terminal 302 generates a Channel Quality Indicator (CQI) indicating a downlink channel state based on a received Reference Signal (RS) transmitted by a base station 301, and transmits the CQI to the base station 301 in step 304. In this case, the terminal 302 can transmit a Channel Sounding Reference Signal (CS/RS) along with the CQI in order for the base station 301 to identify the uplink channel state.

Upon receiving the CQI and/or the CS/RS, the base station 301 determines downlink or uplink resources it will allocate to the terminal 302 through scheduling in step 305, and transmits a scheduling grant indicating the determined downlink/uplink resources to the terminal 302 in step 306. The terminal 302 first determines if the scheduling grant has been delivered to the terminal 302 itself. If the scheduling grant has been delivered to the terminal 302, the terminal 302 recognizes the allocated downlink/uplink resources indicated by the scheduling grant in step 307, and exchanges data with the base station 301 using the allocated downlink/uplink resources in step 308.

The base station 301 delivers the information necessary for data transmission/reception to the terminal 302 using a scheduling grant, and the scheduling grant is transmitted to the terminal 302 through a Physical Downlink Control Channel (PDCCH). The PDCCH uses some of the resources illustrated in FIG. 2. The base station 301 selects one or multiple PDCCHs from among a plurality of available PDCCHs, and transmits the scheduling grant to the terminal 302 through the selected PDCCH(s).

Because the terminal 302 does not know which channel among the multiple PDCCHs transmitted by the base station 301 is used for the terminal 302, the terminal 302 must monitor all PDCCHs transmitted by the base station 301 to determine if there is a PDCCH having a scheduling grant being transmitted to the terminal 302. In this case, if the number of PDCCHs transmitted by the base station 301 is great, the terminal 302 must perform a large number of reception operations to check the scheduling grant, requiring complicated reception structure and increasing power waste of the terminal.

SUMMARY OF THE INVENTION

Accordingly, the present invention has been designed to address at least the problems and/or disadvantages in the prior art and to provide at least the advantages described below.

Accordingly, an aspect of the present invention is to provide a method and apparatus for transmitting and receiving control channels by restricting a set of the control channels in a wireless communication system.

Another aspect of the present invention is to provide a method and apparatus for restricting a monitoring set of control channels that are transmittable to a terminal in a wireless communication system.

In accordance with an aspect of the present invention, a method is provided for transmitting control information, by a base station of a wireless communication system. The method includes transmitting, to a terminal, information associated with a resource region carrying a control channel; transmitting, to the terminal, a plurality of values associated with control channel candidates, each of the plurality of values corresponding to each of a plurality of numbers associated with control channel elements (CCEs) constituting one control channel candidate, wherein the each of the plurality of values indicates a number of control channel candidates to be monitored by the terminal; determining a set of control channel candidates based on an identifier (ID) of the terminal and at least one of the plurality of values associated with the control channel candidates; selecting at least one control channel candidate from among the set of control channel candidates; and transmitting the control information to the terminal through the at least one selected control channel candidate in the resource region.

In accordance with another aspect of the present invention, a method is provided for receiving control information, by a terminal of a wireless communication system. The method includes receiving, from a base station, information associated with a resource region carrying a control channel; receiving, from the base station, a plurality of values associated with control channel candidates, each of the plurality of values corresponding to each of a plurality of numbers associated with control channel elements (CCEs) constituting one control channel candidate, wherein the each of the plurality of values indicates a number of control channel candidates to be monitored by the terminal; determining a set of control channel candidates based on an identifier (ID) of the terminal and at least one of the plurality of values associated with the control channel candidates; and monitoring at least one control channel candidate belonging to the set of control channel candidates in the resource region to receive the control information.

In accordance with another aspect of the present invention, an apparatus is provided for transmitting control information, by a base station of a wireless communication system. The apparatus includes a transceiver; and at least one processor operably connected to the transceiver and configured to transmit, to a terminal, by controlling the transceiver, information associated with a resource region carrying a control channel, transmit, to the terminal, by controlling the transceiver, a plurality of values associated with control channel candidates, each of the plurality of values corresponding to each of a plurality of numbers associated with control channel elements (CCEs) constituting one control channel candidate, wherein the each of the plurality of values indicates a number of control channel candidates to be monitored by the terminal, determine a set of control channel candidates based on an identifier (ID) of the terminal and at least one of the plurality of values associated with the control channel candidates, select at least one control channel candidate from among the set of control channel candidates, and transmit, by controlling the transceiver, the control information to the terminal through the at least one selected control channel candidate in the resource region.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE INVENTION

Various embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operator intention, or usual practices. Therefore, the definitions of the terms should be made based on the contents throughout the specification. Although a description of the present invention will be given herein with reference to the LTE system, by way of example, the present invention can be applied to other wireless communication systems to which base station scheduling is applied, without any modification.

The present invention restricts a set of control channels being monitored by a terminal among all available control channels transmittable by a base station in delivering control information for data transmission and reception to the terminal in a wireless communication system. That is, the present invention presents a scheme for reducing a procedure that a terminal should perform, by restricting the number of control channels that the terminal should receive and decode. Accordingly, the present invention simplifies a structure of the terminal, and enables the terminal to monitor control channels thereby reducing the battery consumption.

A description of an embodiment of the present invention will be given herein with reference to a PDCCH, as a control channel, for carrying a scheduling grant for data transmission and reception between a base station and a terminal. However, it should be noted that the present invention is not limited to transmission and reception of PDCCH.

Figure 1:
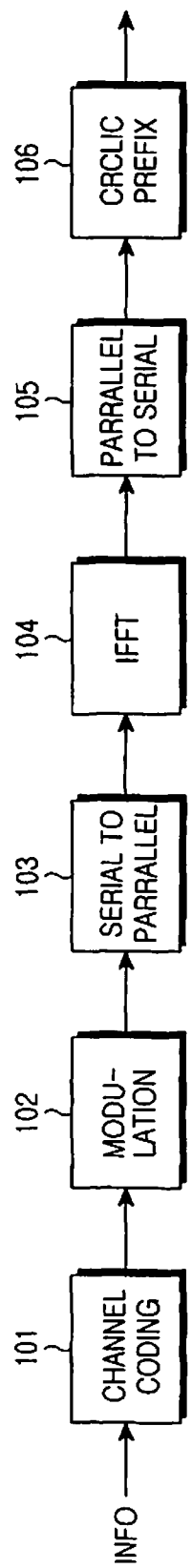
FIG. 1 is a diagram illustrating a structure of a transmitter in a conventional OFDM system.
Figure 2:
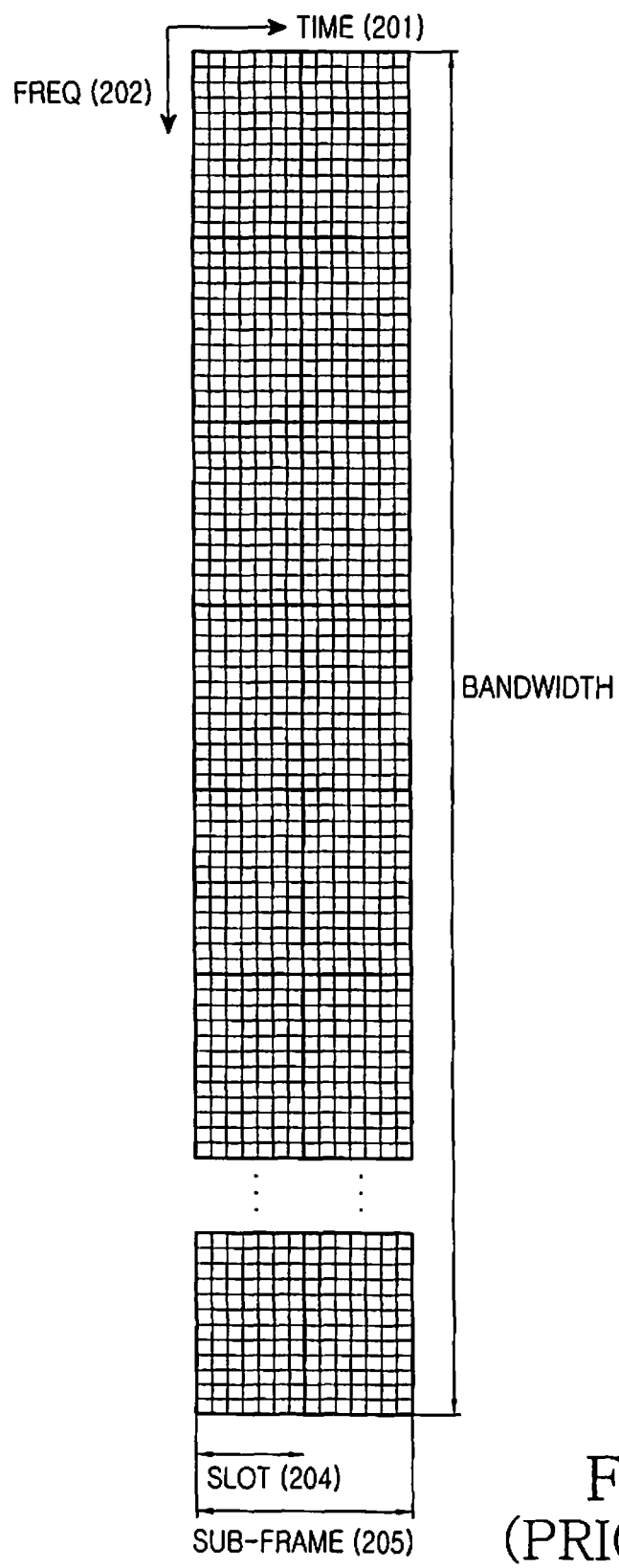
FIG. 2 is a diagram conceptually illustrating resources of a conventional OFDM system.
Figure 3:
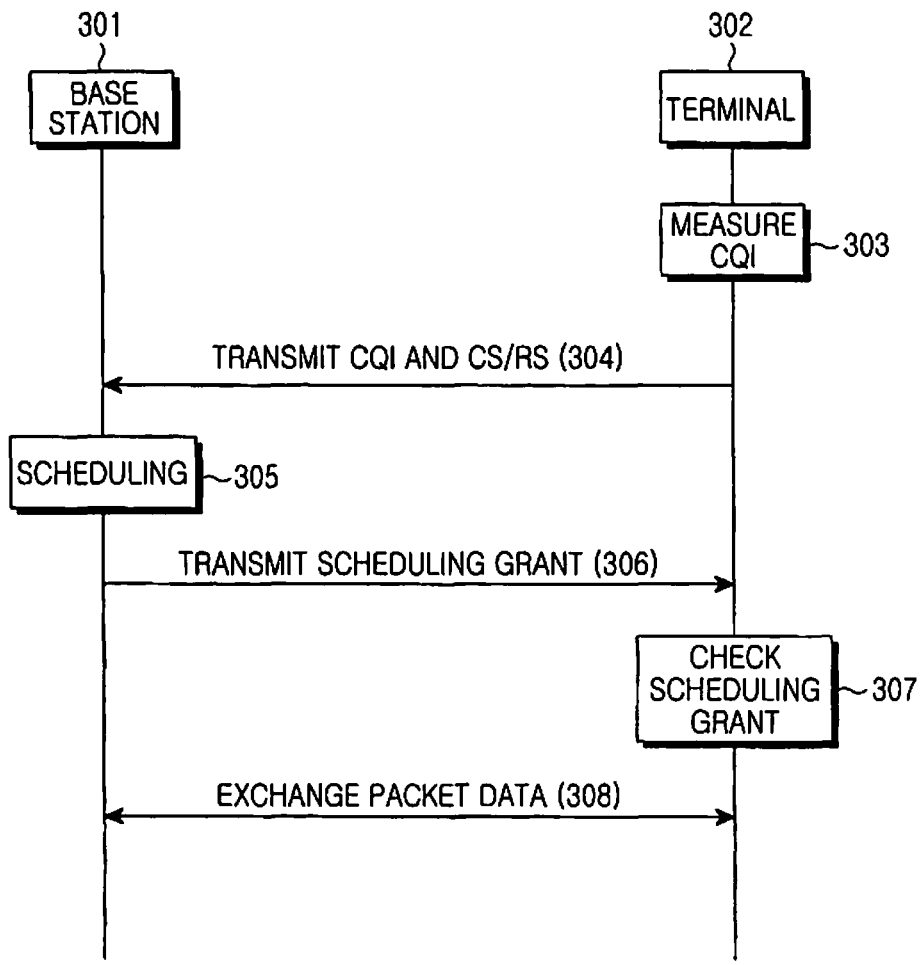
FIG. 3 is a diagram illustrating a data transmission and reception procedure between a base station and a terminal in a conventional OFDM system.
Figure 4:
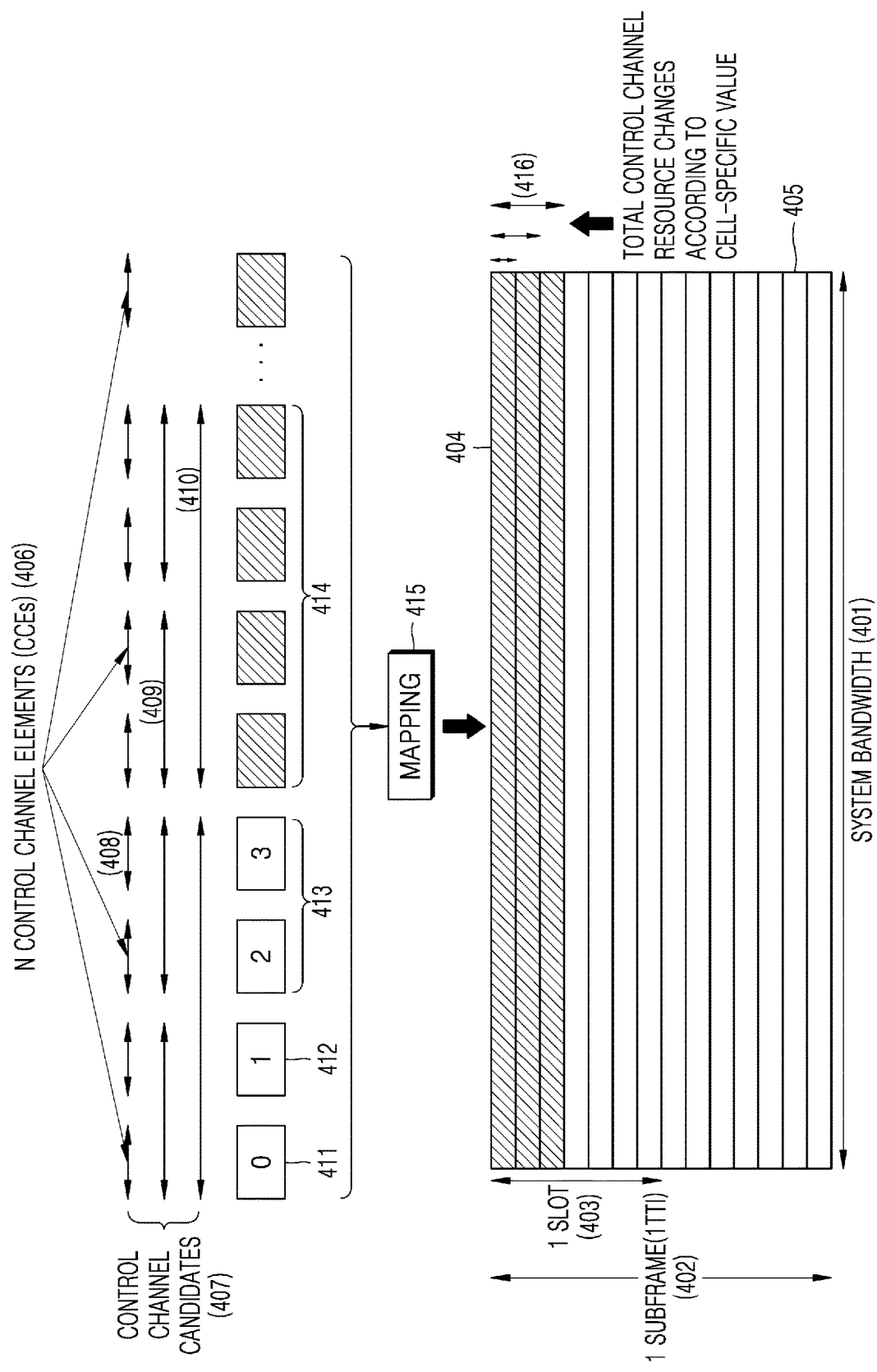
FIG. 4 is a diagram illustrating resource mapping between control channels according to an embodiment of the present invention.

FIG. 4 illustrates resource mapping between control channels according to an embodiment of the present invention. Referring to FIG. 4, in the entire frequency bandwidth (or system bandwidth) 401, the smallest time unit of resources is a slot 403 that includes, for example, 7 OFDM symbols, and 2 slots constitute one subframe 402. The subframe 402 is the smallest unit for resource allocation, and generally has the same length as a Transmission Time Interval (TTI), which is a data transmission unit. PDCCHs are mapped to several leading OFDM symbols 404 (hereinafter referred to as a "control channel resource region") among the multiple OFDM symbols included in the subframe 402, and Physical Downlink Shared Channels (PDSCHs), on which packet data are carried, are mapped to the remaining OFDM symbols 405.

PDCCHs for downlink and uplink transmission for multiple terminals exist in the control channel resource region 404, and each PDCCH is generated as described below. That is, a Control Channel Element (CCE) with a predetermined size is used to generate PDCCH, and one PDCCH includes at least one CCE. That is, a base station transmits control information to a terminal having a good channel state using a PDCCH including one CCE, i.e., by applying a high code rate. However, the base station transmits the same sized control information to a terminal having a poor channel state using a PDCCH including multiple CCEs, i.e., by applying a low code rate. Accordingly, even the terminal in the poor channel condition can stably receive control information through the PDCCH.

For example, PDCCH candidates 407 are generated using CCE sets including 1 CCE 408, 2 CCEs 409, 4 CCEs 410 or 8 CCEs, etc., among multiple CCEs 406 existing in the entire control channel resource region 404. When the total number of CCEs is defined as N, N PDCCH candidates 406 are generated when 1 CCE is used for each PDCCH; [N/2] PDCCH candidates are generated when 2 CCEs are used for each PDCCH; [N/4] PDCCH candidates are generated when 4 CCEs are used for each PDCCH; and [N/8] PDCCH candidates are generated when 8 CCEs are used for each PDCCH. Here, [A] indicates the maximum integer not greater than A.

More specifically, in the example illustrated in FIG. 4, PDCCHs 411 and 412 each are allocated to each terminal using one CCE, PDCCH 413 is allocated using two CCEs, and PDCCH 414 is allocated using four CCEs. The PDCCHs 411, 412, 413, and 414 are mapped 415 to the above-stated control channel resource region 404.

The control channel resource region 404, to which multiple PDCCHs are mapped 415, uses a maximum of several OFDM symbols in one subframe. In this case, the number of simultaneously used PDCCHs, or the number of necessary CCEs, can vary every time, based on the number of terminals currently available and channel states of the terminals, and a size of the control channel resource region 404 for PDCCHs is variable as illustrates by reference numeral 416. The LTE system can change a size 416 of the control channel resource region 404, in which PDCCH(s) are included, using periodic information, and particular information (hereinafter referred to as "Category_0 information (Cat0)" or "Control Channel Format Indicator (CCFI)") mapped to a predetermined OFDM symbol (for example, the first OFDM symbol) of each subframe, or system information transmitted through a Broadcast Channel (BCH) (hereinafter referred to as "BCH information") is used as an example of the periodic information.

A terminal monitors only a set of PDCCHs transmittable to the terminal among all PDCCH candidates transmittable by a base station, without receiving and decoding all of the multiple PDCCH candidates every time to determine if there is control information scheduled to the terminal. The base station transmits a scheduling grant to the terminal using only the restricted set of PDCCHs. Because all the PDCCH candidates can vary depending on the periodic information transmitted by the base station, the set of PDCCHs restricted to the terminal is also subject to change according to the periodic information.

Figure 5A:
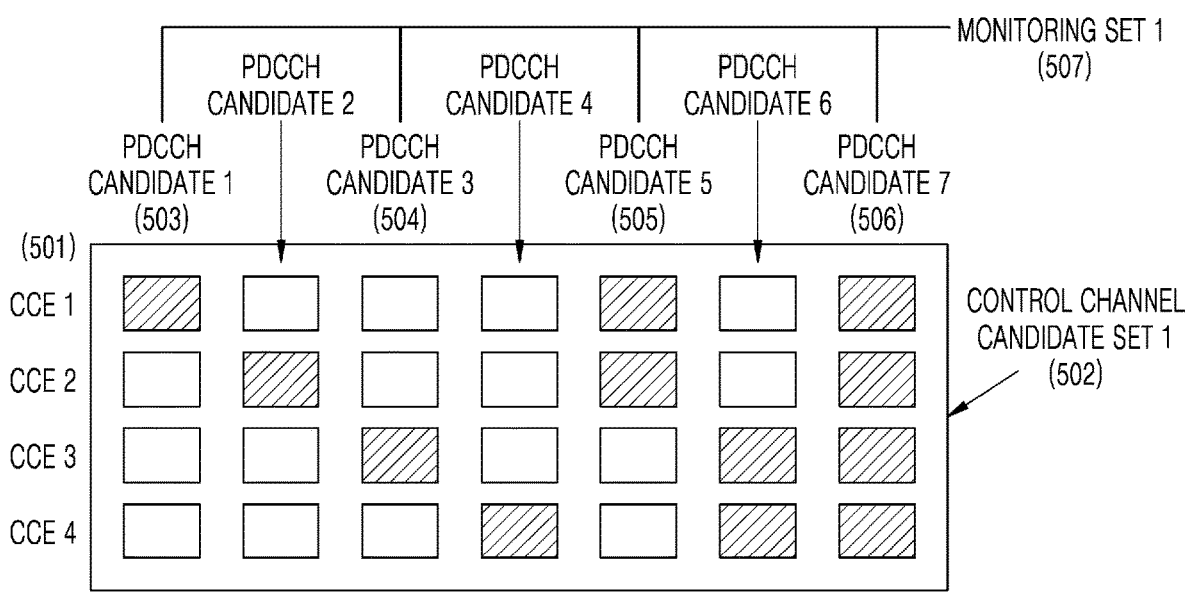
FIGS. 5A and 5B are diagrams illustrating a variable set of PDCCHs that a terminal monitors depending on a change in all PDCCH candidates according to an embodiment of the present invention.
Figure 5B:
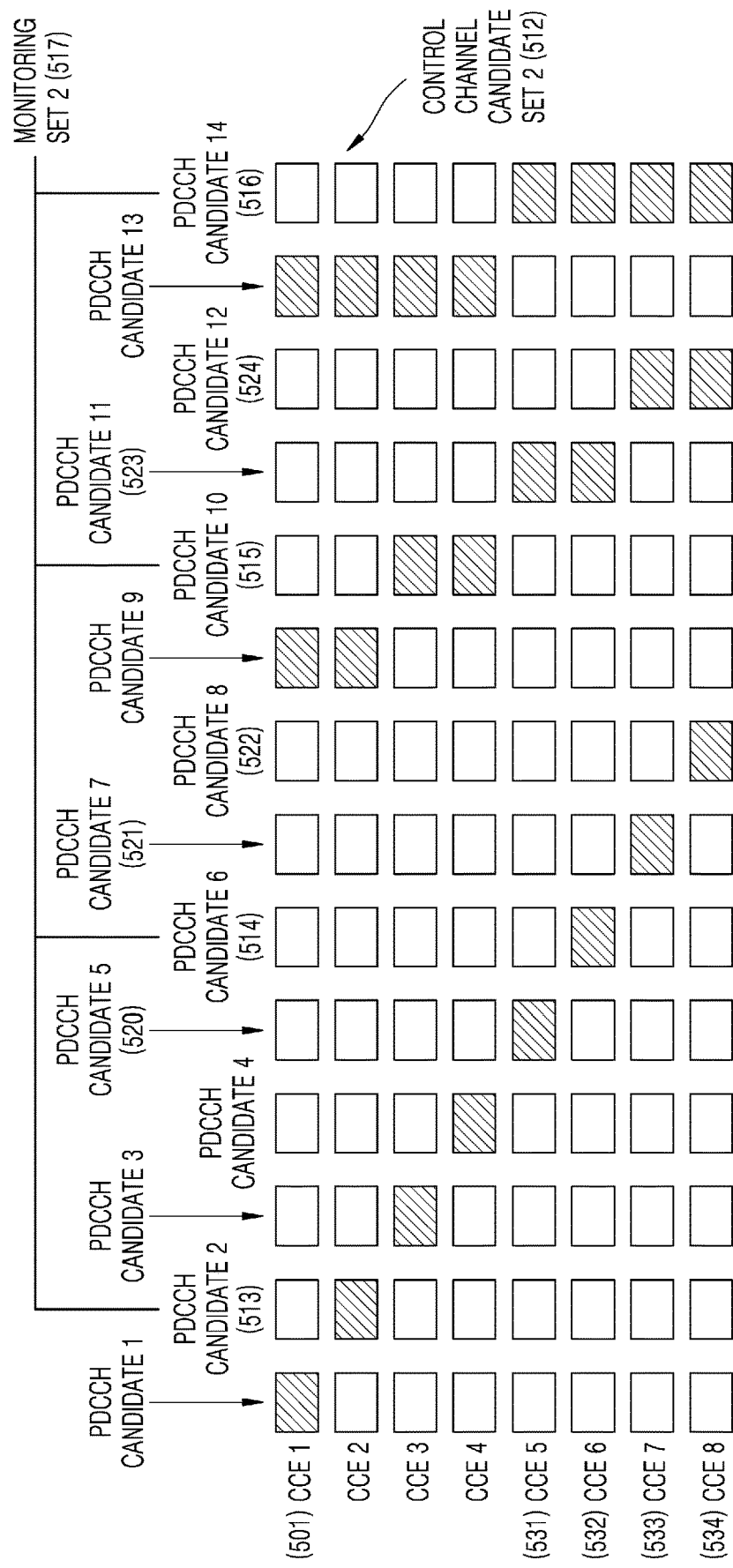

FIGS. 5A and 5B illustrate a variable set of PDCCHs that a terminal monitors depending on a change in all PDCCH candidates according to an embodiment of the present invention. Referring to FIG. 5A, a base station can use 4 CCEs 501 to generate PDCCHs. Therefore, the total number of PDCCH candidates 502 is 7. That is, if the possible number of CCEs, with which PDCCH can be generated, is 1, 2, and 4, four PDCCH candidates #1, #2, #3, and #4 using one CCE, two PDCCH candidates #5 and #6 using two CCEs, and one PDCCH candidate #7 using four CCEs are generated. For example, in FIG. 5A, in the entire PDCCH candidate set 502, a first monitoring set 507 indicating PDCCHs that a terminal monitors is restricted to two PDCCHs 503 and 504 using one CCE, one PDCCH 505 using two CCEs, and one PDCCH 506 using four CCEs. That is, the first monitoring set 507 is restricted to a PDCCH candidate #1 503, a PDCCH candidate #3 504, a PDCCH candidate #5 505, and a PDCCH candidate #7 506 according to a predetermined rule. Thereafter, the base station uses one of the PDCCH candidates in the first monitoring set 507 to transmit control information to the terminal.

Upon detecting a situation where it should increase the number of PDCCHs for the terminal, the base station increases the number of CCEs 511 used for the PDCCHs to, for example, 8, as illustrated in FIG. 5B, and transmits periodic information in order to notify the increase to the terminal. Thereafter, the total number of PDCCH candidates 512 increases to 14, so that PDCCH candidates transmittable to the terminal change as a second monitoring set 517.

More specifically, referring to FIG. 5B, a PDCCH candidate set 512 includes 8 PDCCH candidates PDCCH #1-#8 using one CCE, 4 PDCCH candidates PDCCH #9-#12 using two CCEs, and 2 PDCCH candidates PDCCH #13 and #14 using four CCEs. In the PDCCH candidate set 512, the second monitoring set 517 for a terminal is restricted to, for example, PDCCH candidate #2 513, PDCCH candidate #6 514, PDCCH candidate #10 515, and PDCCH candidate #14 516 according to a predetermined rule. Therefore, the base station uses one of the PDCCH candidates in the second monitoring set 517 to transmit control information to the terminal.

The number of CCEs constituting each PDCCH can be considered as a rule for determining a monitoring set of a control channel for the terminal. When the total number of PDCCH candidates 502 is 7, as in FIG. 5A, two PDCCHs 503 and 504 using one CCE, one PDCCH 505 using two CCEs, and one PDCCH 506 using four CCEs can be restrictively used for the terminal. When the total number of PDCCH candidates 512 is 14, as illustrated in FIG. 5B, two PDCCHs 513 and 514 using one CCE, one PDCCH 515 using two CCEs, and one PDCCH 516 using four CCEs are restrictively used for the terminal.

Therefore, in restricting the monitoring set of PDCCH candidates for a terminal, the present invention can secure various numbers of CCEs for PDCCHs that the terminal monitors, by applying an independent rule according to the number of CCEs per PDCCH. The application of an independent rule for the number of CCEs per PDCCH enables maximal inclusion of the different numbers of CCEs per PDCCH in the monitoring set, so that the terminal can use PDCCHs composed of different numbers of CCEs according to the channel condition.

Figure 6:
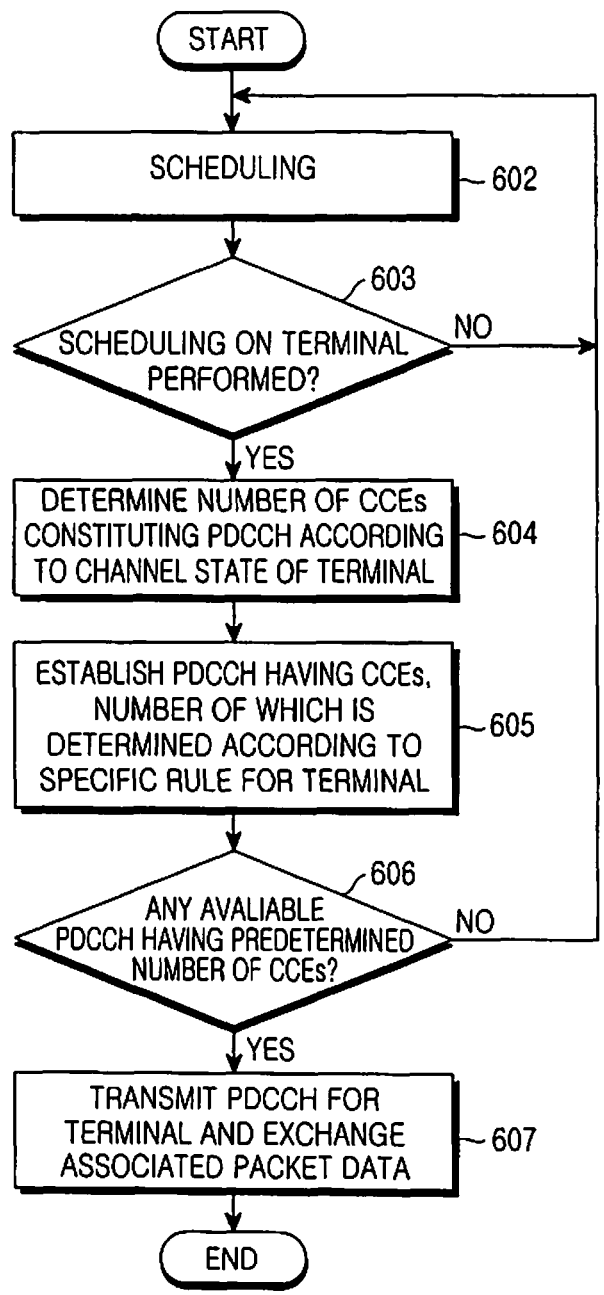
FIG. 6 is a flowchart illustrating a transmission operation of a base station according to an embodiment of the present invention.
Figure 7:
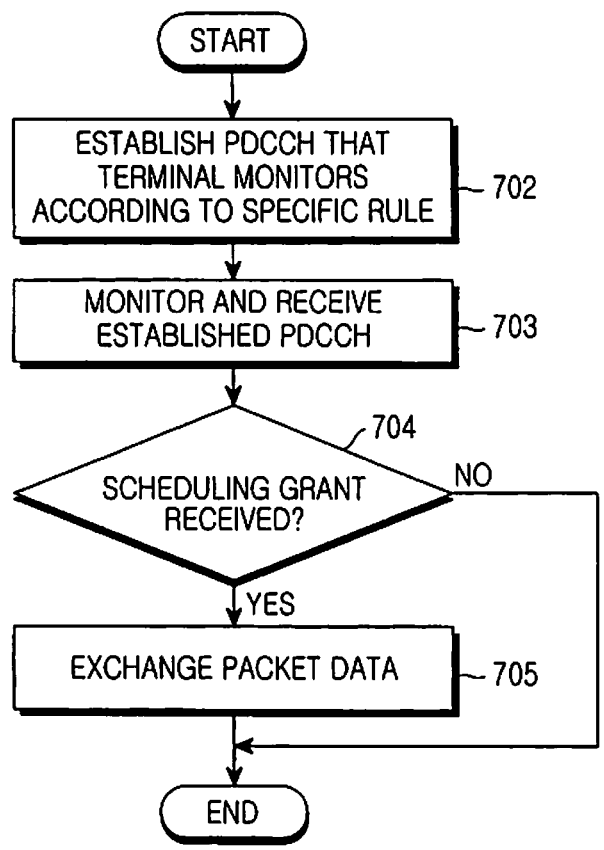
FIG. 7 is a flowchart illustrating a reception operation of a terminal according to an embodiment of the present invention.

With reference to FIGS. 6 and 7, a description will now be made of a transmission operation of a base station and a reception operation of a terminal according to an embodiment of the present invention. Because periodic information from the base station is subject to change every scheduling time (or every subframe), establishment of a monitoring set can also be made every scheduling time.

FIG. 6 is a flowchart illustrating a transmission operation of a base station according to an embodiment of the present invention. Referring to FIG. 6, a base station performs scheduling on terminals in step 602, and in step 603, determines if it should perform scheduling on a particular terminal. If it is determined in step 603 that no scheduling happens on the terminal, i.e., if the terminal is not scheduled, the base station performs scheduling on other terminals in step 603. However, if it is determined in step 603 that scheduling should happen on the terminal and thus data transmission and/or reception of the terminal is scheduled, the base station sets (determines) a number of CCEs constituting PDCCH according to the channel state of the terminal in step 604. In step 605, the terminal establishes a monitoring set, or a set of PDCCH candidates that the terminal can receive while satisfying the determined number of CCEs per PDCCH.

In establishing the monitoring set, the base station may use at least one of (i) periodic information Cat0 and BCH that the base station transmits to the terminal, (ii) upper layer signaling information given to the terminal, and (iii) a terminal identifier (ID).

In step 606, the base station determines if there is an available PDCCH, unused for other terminals, in the monitoring set. If there is no available PDCCH, the base station performs scheduling on other terminals in step 602, and if there is an available PDCCH, the base station transmits a scheduling grant to the terminal using the PDCCH and performs packet data transmission and/or reception according to the scheduling grant in step 607.

FIG. 7 is a flowchart illustrating a reception operation of a terminal according to an embodiment of the present invention. Referring to FIG. 7, a terminal establishes a monitoring set, or a set of receivable PDCCH candidates in step 702. In establishing the monitoring set, the terminal may use at least one of (i) periodic information Cat0 and BCH that a base station transmits to the terminal, (ii) upper layer signaling information given to the terminal, and (iii) a terminal ID.

The terminal monitors and receives each of multiple PDCCHs corresponding to the monitoring set in step 703, and in step 704, determines if the base station has transmitted a scheduling grant to the terminal through one of the PDCCHs. More specifically, the terminal determines if the control information received through each of the multiple PDCCHs has been transmitted to the terminal itself, and if control information for the corresponding terminal is detected from at least one PDCCH the terminal performs packet data transmission and/or reception using the scheduling grant in step 705. However, if no scheduling grant for the corresponding terminal has been received in step 704, the terminal ends the reception operation.

Figure 8:
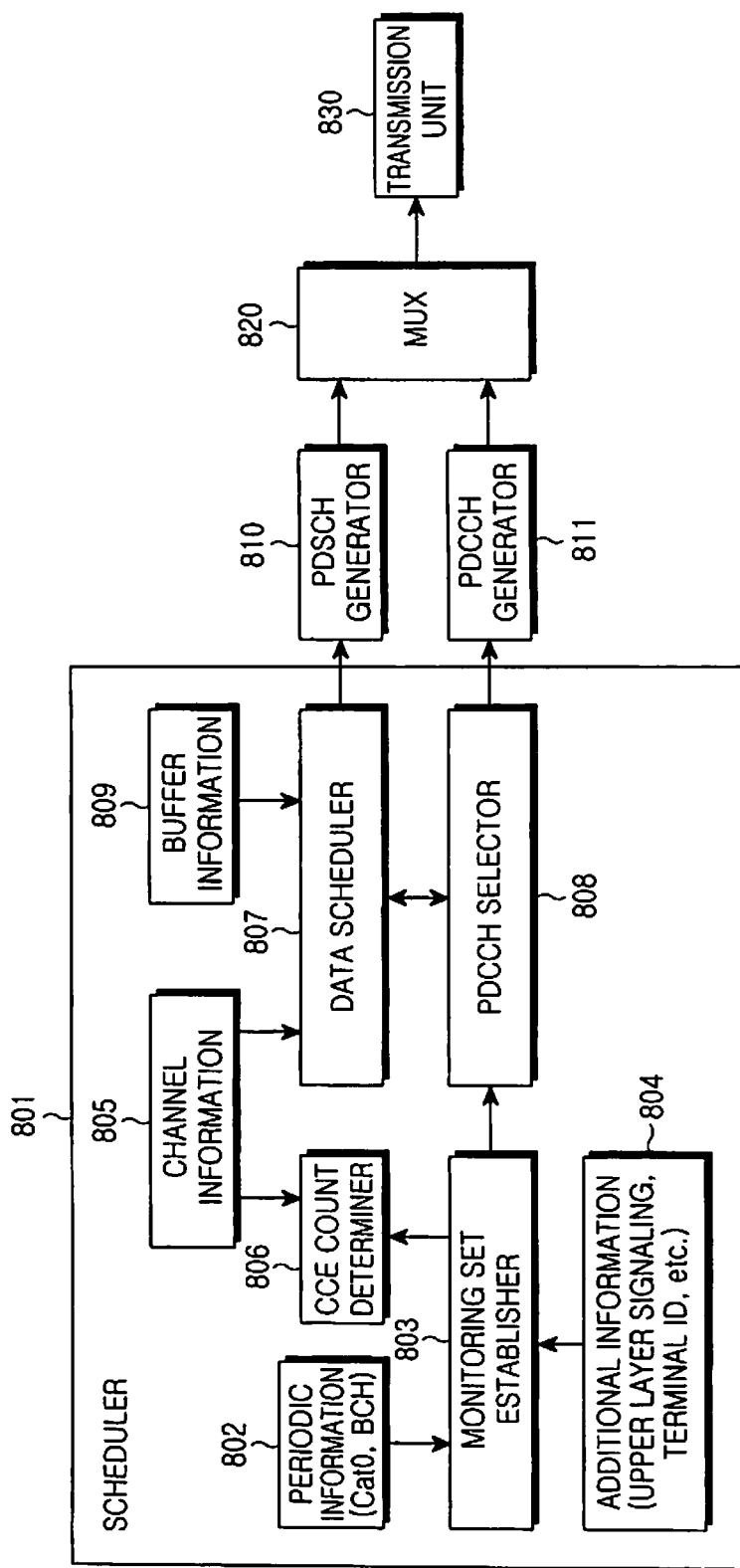
FIG. 8 is a block diagram illustrating a transmitter structure of a base station according to an embodiment of the present invention.

FIG. 8 is a block diagram illustrating a transmitter structure of a base station according to an embodiment of the present invention. Referring to FIG. 8, a monitoring set establisher 803 included in a scheduler 801 of a base station establishes a monitoring set, or a set of PDCCHs allowed for each terminal in communication. In establishing the monitoring set, the monitoring set establisher 803 may use at least one of periodic information 802, such as Cat0, and BCH that a base station transmits to all terminals, and additional information 804 including upper layer signaling information given to a terminal, and a terminal ID. Further, a CCE count determiner 806 sets (or determines) a number of CCEs necessary for generating PDCCH of the terminal according to channel information 805 determined depending on CQI that the terminal transmits to the base station, and provides the determined number of CCEs per PDCCH for the monitoring set establisher 803 to use in establishing a monitoring set of PDCCHs.

A data scheduler 807 performs scheduling using the channel information 805 of the terminal, and buffer information 809 indicating the amount of data that the base station intends to transmit to the terminal. If there is a need for data transmission and/or reception for the terminal as the terminal is scheduled, a PDCCH selector 808 selects one currently available PDCCH among the PDCCHs included in the monitoring set established for the terminal. A PDCCH generator 811 generates control information, i.e., scheduling grant, according to the PDCCH selected by the PDCCH selector 808, and inputs it to a multiplexer 820. Here, the PDCCH selector 808 and the PDCCH generator 811 constitute a PDCCH transmission unit.

A PDSCH generator 810 generates packet data with a predetermined size according to the scheduling result of the data scheduler 807, and inputs the packet data to the multiplexer 820. The packet data is generated when downlink data is scheduled, and no packet data is generated when uplink data is scheduled. The multiplexer (MUX) 820 multiplexes input information and transmits the multiplexed information via a transmission unit 830.

Figure 9:
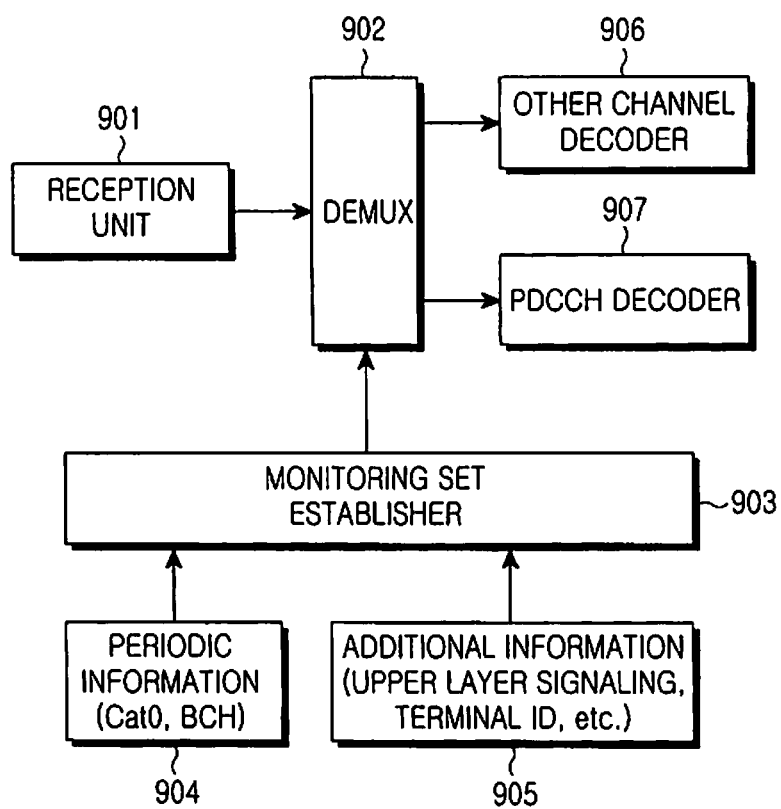
FIG. 9 is block diagram illustrating a receiver structure of a terminal according to an embodiment of the present invention.

FIG. 9 is block diagram illustrating a receiver structure of a terminal according to an embodiment of the present invention. Referring to FIG. 9, a reception unit 901 of a terminal receives a signal from a base station, and a demultiplexer 902 demultiplexes the received signal into channel signals. In demultiplexing a PDCCH signal, a monitoring set establisher 903 uses a monitoring set indicating PDCCHs, which are set to be receivable for the terminal. That is, the monitoring set establisher 903 establishes a monitoring set including PDCCHs that the terminal monitors according to the same rule based on the same information as that of the monitoring set establisher 803 of the base station, and controls the demultiplexer 902 to perform demultiplexing on the PDCCHs belonging to the monitoring set. Because at least one of periodic information 904, such as Cat0, and BCH that a base station transmits to all terminals, and additional information 905 including upper layer signaling information for a terminal and a terminal ID is used for establishing the monitoring set, the monitoring sets established separately by the base station and the terminal include the same PDCCHs.

The channel signals demultiplexed by the demultiplexer 902 are delivered to corresponding channel decoders 906 and 907. Particularly, the PDCCH signals of the monitoring set controlled by the monitoring set establisher 903 are input to a PDCCH decoder 907. The PDCCH decoder 907 determines if a scheduling grant is included in the PDCCH signals, and if it is included, provides the scheduling grant to a data transmission/reception unit (not shown) in order to perform data transmission/reception according to the scheduling grant. Here, the demultiplexer 902 and the PDCCH decoder 907 constitute a PDCCH reception unit.

Above, a description has been made of an operation and apparatus for restricting a monitoring set or a set of PDCCHs that a terminal monitors. A more detailed description will now be made of specific embodiments for establishing a monitoring set for a terminal.

First Embodiment

According to a first embodiment, in establishing a monitoring set of PDCCHs for a terminal, a base station signals to the terminal a number of PDCCHs that the terminal should monitor, regardless of a code rate of each PDCCH. The code rate of PDCCH is referred to herein as 'PDCCH MCS', since it is indicated according to a Modulation and Coding Scheme (MCS) level indicating a combination of a modulation scheme and a code rate for an Adaptive Modulation and Coding (AMC) operation. Here, PDCCH MCS corresponds to the number of CCEs constituting one PDCCH.

A terminal identifies a PDCCH that it should monitor, based on (i) the number of PDCCHs for each PDCCH MCS determined according to periodic information, such as Cat or BCH, (ii) the number of PDCCHs that the terminal should monitor, which is set by upper layer signaling according to the terminal, and (iii) a random number generation function that uses a terminal ID or transmission time as its variable. Because a base station may also determine (i) the number of PDCCHs for each PDCCH MCS determined according to periodic information, such as Cat or BCH, (ii) the number of PDCCHs that the terminal should monitor, which is set by upper layer signaling according to the terminal, and (iii) a terminal ID or transmission time, the base station determines PDCCHs that the terminal should monitor, and transmits a scheduling grant using one of the determined PDCCHs.

A subframe indicator may be used as transmission time information used as a variable of the random number generation function. Because an available monitoring set is subject to change at every subframe as the transmission time information is considered, the base station has flexibility in using PDCCHs. That is, if a PDCCH having a desired PDCCH MCS is not included in a monitoring set in the current subframe as the monitoring set changes at every subframe, there is a possibility that the PDCCH having the PDCCH MCS will be included in a monitoring set in the next subframe.

Second Embodiment

According to a second embodiment, in establishing a monitoring set for a terminal, a base station signals to the terminal a number of PDCCHs that the terminal monitors according to a code rate of each PDCCH. Therefore, even though the total number of PDCCHs that the base station can use varies according to the periodic information, the terminal always monitors the same number of PDCCHs according to the PDCCH MCS.

The terminal identifies PDCCH that it should monitor for each PDCCH MCS, based on (i) the number of PDCCHs for each PDCCH MCS determined according to periodic information, such as Cat or BCH, (ii) the number of PDCCHs that the terminal should monitor according to PDCCH MCS which is set by upper layer signaling according to the terminal, and (iii) a random number generation function that uses a terminal ID or transmission time as its variable. Because a base station may also determine (i) the number of PDCCHs for each PDCCH MCS determined according to periodic information, such as Cat or BCH, (ii) the number of PDCCHs that the terminal should monitor according to PDCCH MCS which is set by upper layer signaling according to the terminal, and (iii) a terminal ID or transmission time, the base station transmits a scheduling grant using one of the PDCCHs that the terminal can receive. The second embodiment determines PDCCH that it should monitor using the random number generation function for each terminal in order to enable one PDCCH to be used with a same probability, if possible, between several terminals so that several terminals can have flexibility in using the restricted number of PDCCHs.

Third Embodiment

When a random number generation function is used to determine a PDCCH that the terminal should monitor, several terminals may receive and decode the same PDCCH. Therefore, in establishing a monitoring set for a terminal, the third embodiment transmits to the terminal a separate variable based on PDCCH MCS by upper layer signaling, so the base station directly determines the PDCCHs that the terminal should monitor for each PDCCH MCS. For example, the base station signals offset and modular values for each PDCCH MCS, and sets an $i(n)^{th}$ PDCCH satisfying Equation (1) as a member of a monitoring set for the terminal.

$$i(n)+\text{offset}(n)\bmod \text{modular}(n)=0 \quad (1)$$

In Equation (1), i(n) denotes an index of PDCCH with PDCCH MCS=n, and its scope is determined according to periodic information, such as Cat0 or BCH. Further, Offset (n) and modular(n) are variables used for PDCCH MCS=n, and are delivered to the terminal through upper layer signaling.

Because the base station can acquire upper layer signaling information for the terminal, it determines PDCCHs that the terminal can receive, using Equation (1), and transmits a scheduling grant using one of the PDCCHs.

Fourth Embodiment

A base station signals an offset value along with the number Num_PDCCH of PDCCHs that a terminal should monitor for each PDCCH MCS, and sets an $i(n)^{th}$ PDCCH satisfying Equation (2) as a member of a monitoring set for the terminal. In the following, Total_PDCCH (n) denotes the total number of PDCCHs with PDCCH MCS=n, that the base station can transmit, which is determined according to periodic information, such as Cat0 or BCH.

$$i(n)+\text{offset}(n) \bmod \text{modular}(n)=0$$

$$\text{modular}(n)=[\text{Num\_PDCCH}(n)/\text{Total\_PDCCH}(n)] \quad (2)$$

In Equation (2), i(n) denotes an index of PDCCH with PDCCH MCS=n, and has a scope ranging from 1 to Total_PDCCH (n). Further, Offset(n) and Num_PDCCH (n) are variables used for PDCCH MCS=n, and are delivered to the terminal by upper layer signaling.

Because the base station may acquire upper layer signaling information for the terminal, it determines PDCCHs that the terminal can receive, using Equation (2), and transmits a scheduling grant using one of the PDCCHs.

Fifth Embodiment

In establishing a monitoring set for a terminal, a fifth embodiment restricts the number of CCEs that the terminal receives, and uses PDCCH(s) including the restricted number of CCEs as a monitoring set. The number of CCEs that a base station uses in transmitting PDCCH is determined according to periodic information, such as Cat0 or BCH, and regardless of the total number of CCEs, the base station notifies the number of CCEs that the terminal can receive, to the terminal through upper layer signaling. The terminal identifies CCEs it can receive, among all the CCEs determined according to the periodic information such, as Cat or BCH, using the number of CCEs that the terminal can receive, which is determined by upper layer signaling. A random number generation function can be used to determine the CCEs, and in determining CCEs, consecutive CCEs can be used, the number of which is equal to the number of CCEs that the terminal can receive.

For example, in FIG. 5B, if the terminal is set such that it can receive 4 CCEs of CCE5 531, CCE6 532, CCE7 533, and CCE8 534, a set of possible PDCCHs including CCEs 531-534 is established according thereto. That is, PDCCHs 520, 514, 521, and 522 composed of one CCE, PDCCHs 523 and 524 composed of two CCEs, and PDCCH 516 composed of four CCEs are defined as a monitoring set of PDCCHs that the terminal monitors.

Sixth Embodiment

In establishing a monitoring set for a terminal, a sixth embodiment establishes the PDCCH having the lowest PDCCH MCS as a monitoring set, i.e., only the PDCCH composed of the greatest number of CCEs, among the PDCCHs that the terminal should monitor. Then, regarding CCEs constituting the PDCCH, the monitoring set for the terminal is determined as PDCCHs indicating another PDCCH MCS, which include the CCEs. That is, if the base station notifies PDCCH MCS of a reference PDCCH that the terminal should receive, and the number of PDCCHs having the PDCCH MCS, by upper layer signaling, the PDCCHs that the terminal now monitors is determined based thereon according to a predetermined rule.

For example, if the reference PDCCH is a PDCCH candidate 516 illustrated in FIG. 5B, the terminal receives four CCEs of CCE5 531, CCE6 532, CCE7 533, and CCE8 534 for the reference PDCCH 516. Therefore, all other possible PDCCHs including the four CCEs 531-534 are defined as a monitoring set for the terminal. In FIG. 5B, PDCCHs 520, 514, 521, and 522 including one CCE and PDCCHs 523 and 524 including two CCEs are included in a PDCCH set that the terminal must monitor.

The sixth embodiment can restrict even a particular PDCCH MCS. For example, if a channel condition of a terminal is poor, the sixth embodiment makes a restriction such that the terminal should not monitor the PDCCHs including one CCE. Then the terminal monitors only the three PDCCHs 523, 524, and 516.

Seventh Embodiment

In establishing a monitoring set for a terminal, a seventh embodiment sets a number of CCEs constituting a PDCCH having one PDCCH MCS, i.e., one PDCCH, among the PDCCHs that the terminal must monitor, and establishes a monitoring set based thereon. For example, the seventh embodiment establishes a monitoring set that has PDCCH including one CCE as a member, for a terminal in a good channel state, and establishes a monitoring set that has PDCCH including many CCEs as a member, for a terminal in a poor channel state. Although it is assumed in the foregoing other embodiments that multiple PDCCH MCSs are set, the sixth embodiment sets one PDCCH MCS in order to reduce the complexity required for receiving PDCCH(s) for each of various PDCCH MCSs.

A level of the PDCCH MCS is notified separately for each terminal through upper layer signaling. The base station sets and notifies PDCCH MCS that uses the lesser number of CCEs, for a terminal in a better channel state according to the average channel state of each terminal, and sets and notifies PDCCH MCS that uses the greater number of CCEs, for a terminal in a worse channel state. If the base station establishes, by upper layer signaling, a PDCCH monitoring set that uses a predefined PDCCH MCS for a terminal in the state before PDCCH MCS is set, PDSCH information including upper layer signaling information indicating PDCCH MCS to be used later can be transmitted through one of the PDCCHs in the monitoring set.

For example, if a terminal is set to receive PDCCH including one CCE among the PDCCH candidates illustrated in FIG. 5B as its channel state is good, PDCCH candidates #5 520, #6 514, #7 521, and #8 522 among the PDCCH candidates #1-8 including one CCE are included in a PDCCH monitoring set.

More specifically, a function of defining PDCCH that the terminal must monitor is a random number generation function that has, as its factors, (i) the number of PDCCHs for each PDCCH MCS determined according to periodic information, such as Cat0 or BCH, (ii) the number (i.e., a level of PDCCH MCS) of CCEs used by PDCCHs that the terminal must monitor, which is set by upper layer signaling according to the terminal, and (iii) a terminal ID or transmission time.

The foregoing embodiments have presented rules for defining a monitoring set or a set of PDCCHs that the terminal should monitor. In defining the monitoring set of PDCCHs, the embodiments need upper layer signaling, and the upper layer signaling information is transmitted to the terminal through a downlink packet. Therefore, the terminal, before it identifies a set of PDCCHs it should monitor, needs to monitor a PDCCH in order to receive upper layer signaling information. In this case, the upper layer signaling information is transmitted to the terminal through one of the following methods.

1) A terminal receives PDCCH information used for identifying a set of PDCCHs it should monitor, using periodic system information (or BCH information). In this case, if there is a need for PDCCH to transmit BCH information, a base station can separately define PDCCH for, for example, Dedicated (D)-BCH information in transmitting the D-BCH information.

2) A terminal receives PDCCH information used for identifying a set of PDCCHs it should monitor, using the message information that the base station provides to the terminal through a Random Access procedure. In the RACH procedure, if there is a need for PDCCH in transmitting the message information over the downlink, PDCCH for the message information can be separately defined or can be determined based on the previously received BCH information.

3) A base station defines a reference set of PDCCHs that a terminal should always monitor based on a predetermined rule before a set of PDCCHs the terminal should monitor is determined, and the terminal monitors the PDCCHs included in the reference set of the terminal.

As is apparent from the foregoing description, in an OFDMA communication system in which a base station transmits a scheduling grant and a terminal receives the scheduling grant, the present invention restricts a number of control channels that the terminal monitors, thereby reducing the reception complexity of the terminal and avoiding battery consumption. In addition, even though the total number of control channels varies, the present invention can maintain the number of control channels that the terminal monitors, to some extent.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting control information by a base station in a wireless communication system, the method comprising:
    transmitting, to a terminal, information associated with a resource region carrying a control channel;
    transmitting, to the terminal, a plurality of values associated with control channel candidates, the plurality of values respectively corresponding to a plurality of numbers associated with control channel elements (CCEs) constituting one control channel candidate, wherein each of the plurality of values indicates a number of control channel candidates to be monitored by the terminal;
    determining a set of control channel candidates for the terminal to monitor, based on an identifier (ID) of the terminal and at least one of the plurality of values associated with the control channel candidates; and
    transmitting the control information to the terminal through one control channel among the set of control channel candidates in the resource region.

2. The method of claim 1, wherein the set of control channel candidates is determined further based on a number of control channel candidates in the resource region, and the number of control channel candidates corresponding to a number of CCEs constituting one control channel candidate.

3. The method of claim 1, wherein the set of control channel candidates is determined further based on a number of CCEs constituting one control channel candidate.

4. The method of claim 1, wherein the plurality of values associated with the control channel candidates are transmitted through an upper layer signaling.

5. The method of claim 1, wherein the resource region comprises a time resource and a frequency resource.

6. The method of claim 1, wherein the set of control channel candidates is determined further based on transmission time information.

7. A method for receiving control information by a terminal in a wireless communication system, the method comprising:
    receiving, from a base station, information associated with a resource region carrying a control channel;
    receiving, from the base station, a plurality of values associated with control channel candidates, the plurality of values respectively corresponding to a plurality of numbers associated with control channel elements (CCEs) constituting one control channel candidate, wherein each of the plurality of values indicates a number of control channel candidates to be monitored by the terminal;
    determining a set of control channel candidates based on an identifier (ID) of the terminal and at least one of the plurality of values associated with the control channel candidates; and
    monitoring the set of control channel candidates in the resource region to receive the control information through one control channel among the set of control channel candidates.

8. The method of claim 7, wherein the set of control channel candidates is determined further based on a number of control channel candidates in the resource region, and the number of control channel candidates corresponding to a number of CCEs constituting one control channel candidate.

9. The method of claim 7, wherein the set of control channel candidates is determined further based on a number of CCEs constituting one control channel candidate.

10. The method of claim 7, wherein the resource region comprises a time resource and a frequency resource.

11. The method of claim 7, wherein the plurality of values associated with the control channel candidates are received through an upper layer signaling.

12. The method of claim 7, wherein the set of control channel candidates is determined further based on transmission time information.

13. An apparatus for transmitting control information by a base station in a wireless communication system, the apparatus comprising:
    a transceiver; and
    at least one processor operably connected to the transceiver and configured to:
        transmit, to a terminal, by controlling the transceiver, information associated with a resource region carrying a control channel,
        transmit, to the terminal, by controlling the transceiver, a plurality of values associated with control channel candidates, the plurality of values respectively, corresponding to a plurality of numbers associated with control channel elements (CCEs) constituting one control channel candidate, wherein each of the plurality of values indicates a number of control channel candidates to be monitored by the terminal,
        determine a set of control channel candidates for the terminal to monitor, based on an identifier (ID) of the terminal and at least one of the plurality of values associated with the control channel candidates, and
        transmit, by controlling the transceiver, the control information to the terminal through one control channel among the set of control channel candidates in the resource region.

14. The apparatus of claim 13, wherein the set of control channel candidates is determined further based on a number of control channel candidates in the resource region, and the number of control channel candidates corresponding to a number of CCEs constituting one control channel candidate.

15. The apparatus of claim 13, wherein the set of control channel candidates is determined further based on a number of CCEs constituting one control channel candidate.

16. The apparatus of claim 13, wherein the resource region comprises a time resource and a frequency resource.

17. The apparatus of claim 13, wherein the plurality of values associated with the control channel candidates are transmitted through an upper layer signaling.

18. The apparatus of claim 13, wherein the set of control channel candidates is determined further based on transmission time information.

* * * * *

UNITED STATES PATENT AND TRADEMARK OFFICE
CERTIFICATE OF CORRECTION

PATENT NO. : 11,558,164 B2
APPLICATION NO. : 17/087137
DATED : January 17, 2023
INVENTOR(S) : Yong-Jun Kwak et al.

It is certified that error appears in the above-identified patent and that said Letters Patent is hereby corrected as shown below:

In the Claims

In Column 14, Line 54, in Claim 13:
"candidates, the plurality of values respectively, cor-"
Should be:
-- candidates, the plurality of values respectively cor- --.

Signed and Sealed this
Twenty-seventh Day of June, 2023

Katherine Kelly Vidal
*Director of the United States Patent and Trademark Office*